Dec. 5, 1950  R. LA V. KINDSVATTER  2,532,815
SPECIAL LOCK SCREW
Filed Aug. 29, 1947  3 Sheets-Sheet 1
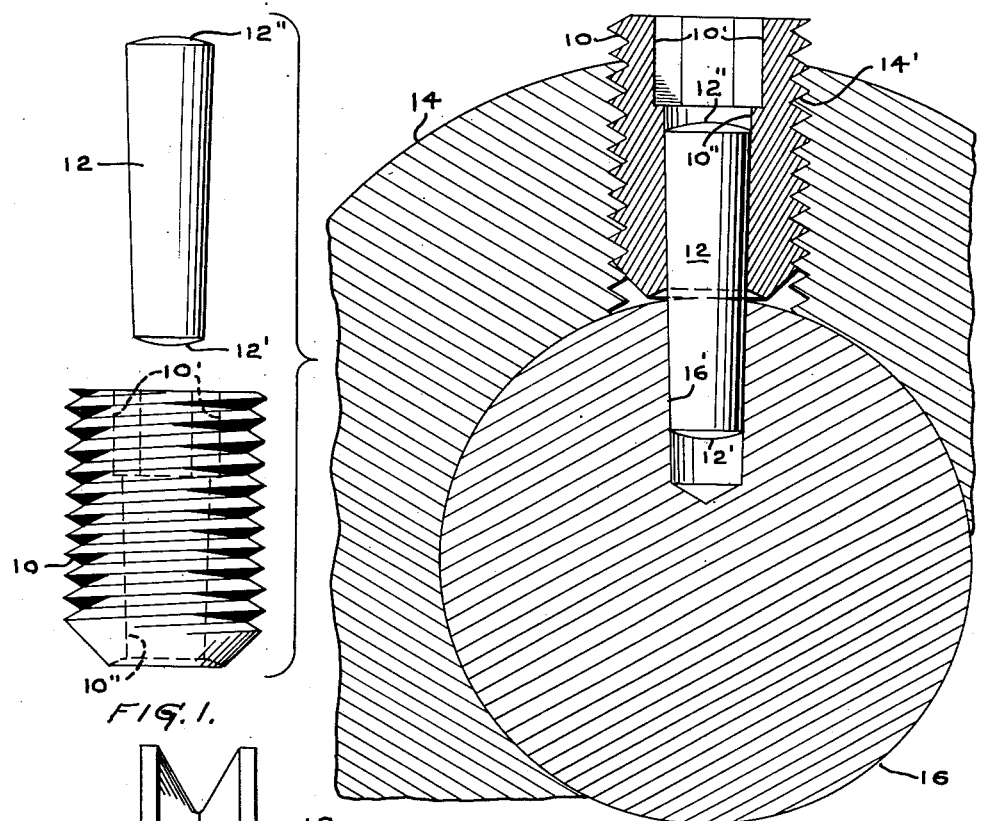
FIG. 1.
FIG. 3.
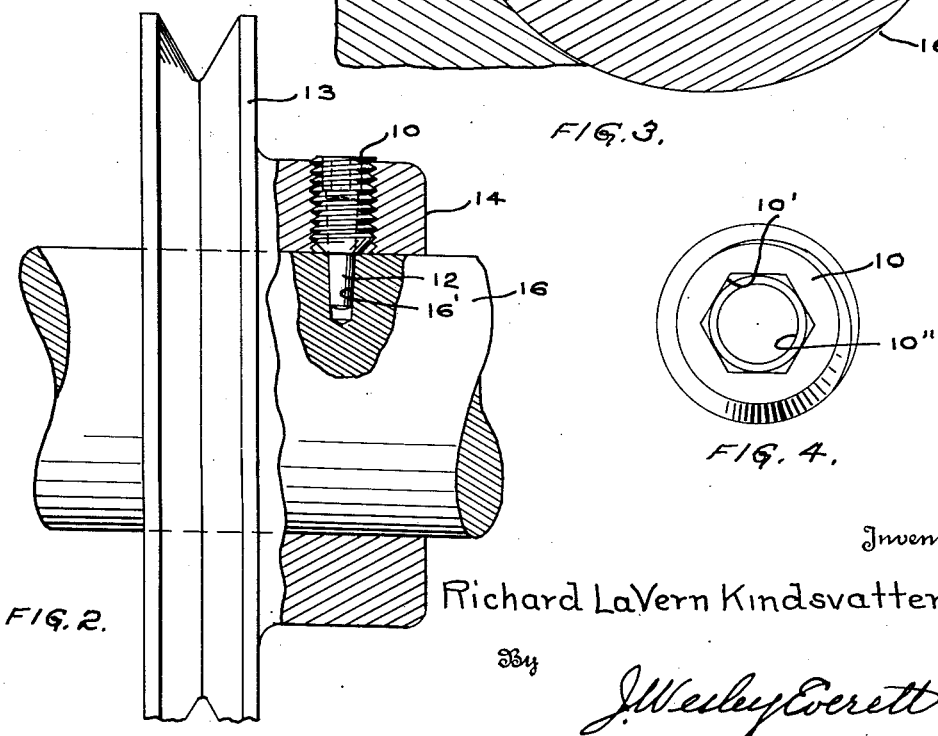
FIG. 2.
FIG. 4.
Inventor
Richard LaVern Kindsvatter
By
J. Wesley Everett

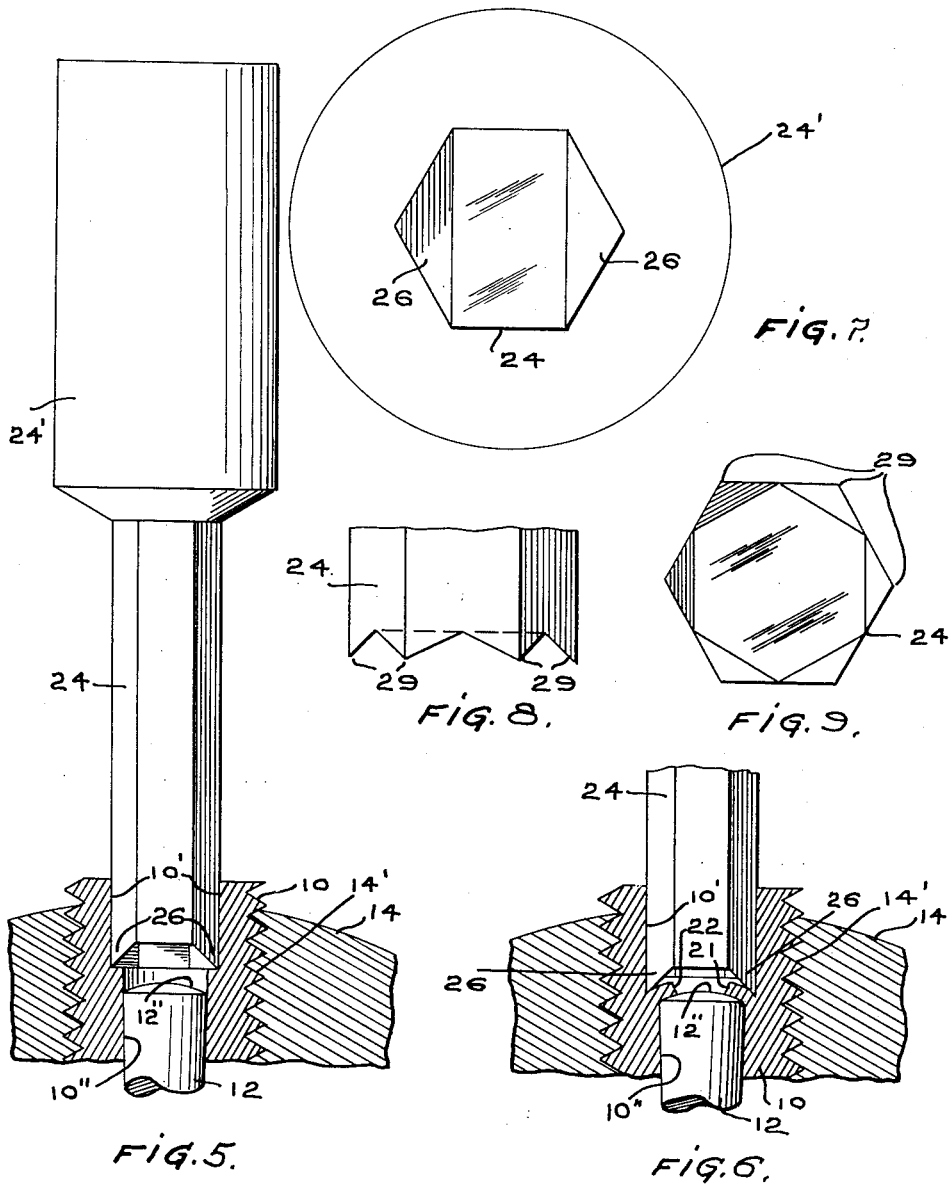

Dec. 5, 1950     R. LA V. KINDSVATTER     2,532,815
SPECIAL LOCK SCREW
Filed Aug. 29, 1947     3 Sheets-Sheet 3
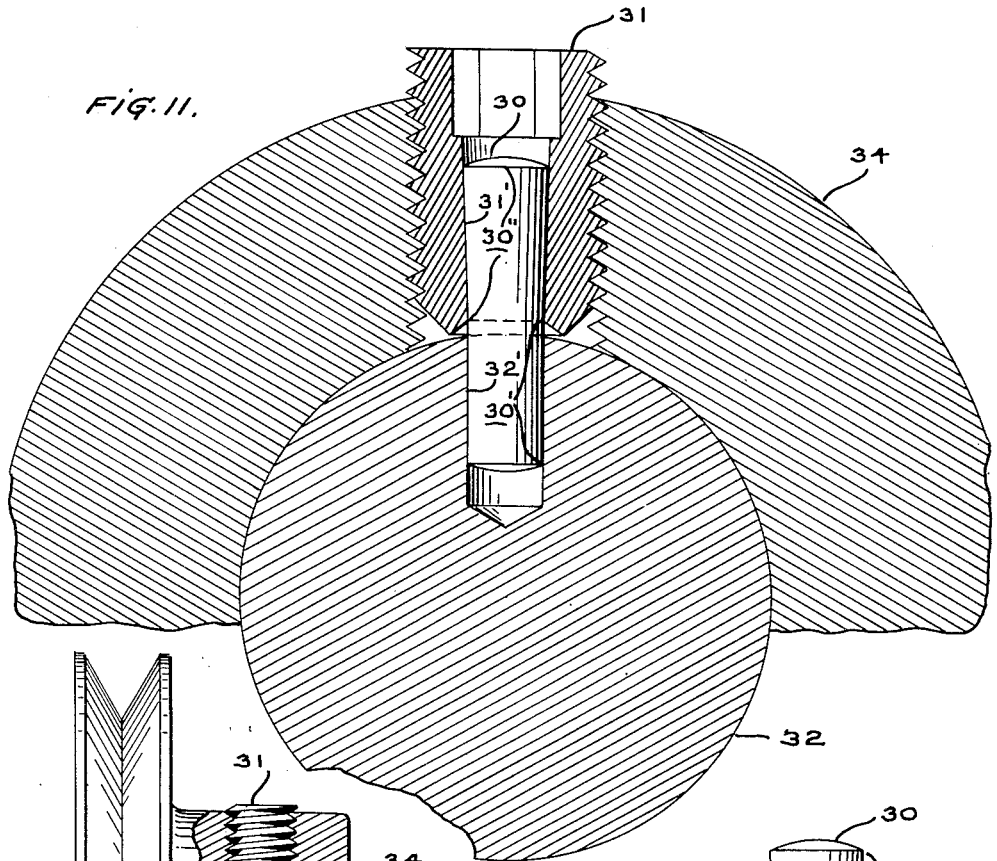
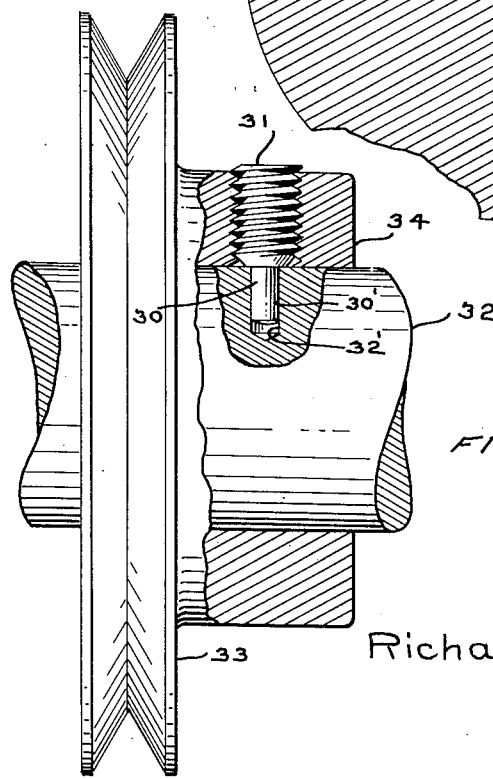
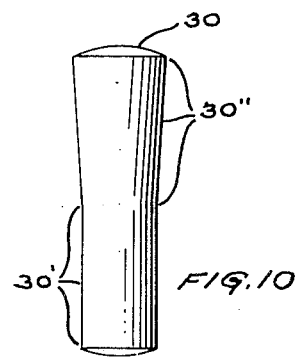
Inventor
Richard LaVern Kindsvatter
By
J. Wesley Everett

Patented Dec. 5, 1950

2,532,815

UNITED STATES PATENT OFFICE 2,532,815

SPECIAL LOCK SCREW

Richard La Vern Kindsvatter, Hagerstown, Md., assignor to Hagerstown Engineering Company, Inc., Hagerstown, Md., a corporation of Maryland Application August 29, 1947, Serial No. 771,215

6 Claims. (Cl. 287—52.08)

The present invention relates to a special lock screw and is particularly adapted for securing couplings, gears, pulleys, and the like to a shaft member although the principles of the invention may be applicable to other uses, and the lock screw may be employed in general where various elements are capable of being held together by a set screw or similar holding means. Regardless, however, of the specific use to which the lock screw is put, the essential features of the invention are at all times preserved.

One of the objects of the invention is the incorporation of both the principles of a standard set screw and a tapered pin in a novel locking combination.

Another object is to provide a new and efficient method for removing the pin at any time the need should arise.

Still another object is to provide an improved method of installing or applying the lock screw to the elements which are to be locked.

A further object is to provide a lock screw which may be practical in its application and simple and economical in its construction.

While several objects of the invention have been specifically pointed out, other objects and advantages will also be apparent as the nature and purpose of the invention are more fully described in the following specification and shown in the accompanying drawings in which:

Figure 1 is an exploded view of the improved lock screw.

Figure 2 is a view of a pulley secured to a fragmentary portion of a shaft having parts of the pulley and shaft broken away to illustrate the manner in which the lock screw is used.

Figure 3 is an enlarged fragmentary sectional view similar to that shown in Figure 2.

Figure 4 is a top plan view of the screw.

Figure 5 is a view of a special tool for locking the screw and pin elements together.

Figure 6 is a view similar to Figure 5 showing the manner in which the pin is locked within the set screw.

Figure 7 is an inverted plan view of the tool as shown in Figures 5 and 6.

Figure 8 is a fragmentary view in elevation of a modified form of tool.

Figure 9 is an inverted plan view of the modified form of tool, as shown in Figure 8.

Figure 10 is a modified form of pin.

Figure 11 is a view similar to Figure 3, showing the detail manner in which the pin and set screw are assembled.

Figure 12 is a view similar to that shown in Figure 2 illustrating one of the uses to which the special lock screw is put.

Referring to the drawings in which like numerals are used to represent similar parts throughout the several views, the improved lock screw comprises principally the novel combination of a set screw member 10 and a tapered pin 12. The screw is preferably provided with a hexagonal recess 10' for receiving a wrench, or other means, for rotating the screw. However, the recess may be of any desired form, or the screw may be provided with a head, slot, or in other conventional form for receiving a wrench or similar tool for rotating the same. Extending downwardly from the bottom of the recess 10' and through the screw 10 is a gradually tapered aperture 10" which taper is of substantially the same size and taper as the upper end portion 12" of the pin. As the pin is received within the aperture 10" of the screw, the upper portion of the pin is of such diameter as to provide a driving fit within the aperture 10" which will provide sufficient friction between the screw member and the pin to prevent the pin from moving outwardly through the screw after it has once been driven in place. The relatively long gradual taper of both the aperture 10" and the pin 12 are such that after the pin has been firmly driven into place, the screw and pin become, for all practical purposes, locked together.

For locking a pair of members, such as a pulley 13 to a shaft, by use of the special lock screw, one of the members 14 is drilled and tapped as shown at 14' in Figure 3. A screw 10, which is of the proper size and also threaded, is screwed into the threaded aperture 14' until the inner end of the screw comes to rest firmly upon a second member 16. Using the aperture 10" of the screw as a guide, the second member 16 is drilled to receive the inner end 12' of the pin. The aperture 16' is preferably of the same long gradual taper as the aperture within the aperture within the screw. After the aperture 16' has been drilled and tapered to the proper size, the pin is then placed within the upper end of the set screw and driven through the aperture 10" to a point where the pin becomes securely seated within both the tapered portion of the screw and the aperture 16' of the shaft element 16. The head 12" of the pin, when in seated position, should be slightly below the bottom of the recess 10'. This will assure ample space for the wrench, or other means for rotating the screw.

A modified form of the pin is shown in Figures 10 to 12. In this form, the pin 30 is provided with a cylindrical portion 30' which is adapted to be received within the second member 32, while the outer portion 30" of the pin is of substantially the same gradual taper as that shown and described previously for the preferred form. The tapered portion 30" of the pin when in seated position within the screw 31 ends slightly within the aperture 31' in order that the tapered portion of the pin will not enter the aperture 32' of the member 32. The aperture 32' differs from the aperture 16' in that the aperture 32' is cylindrical throughout its entire length and is of such size as to receive the cylindrical portion 30' of the pin.

This form of pin is used in substantially the same manner as the preferred form, except in the method of applying the lock screw to the members which are to be fastened thereby. In this form the set screw is screwed into the first member 34 until its inner end comes in contact with the second member 32, and using the aperture of the screw as a guide a round cylindrical hole is drilled into the second member for receiving the cylindrical portion 30' of the pin.

The modified form of lock screw is used for the same and similar purposes as the preferred form as shown in Figure 12, the example shown being for locking a pully 33 to a shaft 32.

In instances here there is an exceptional amount of vibration, or in certain construction in which the code is such that it is either required or advisable to lock the pin and the screw, a novel locking method is illustrated in Figures 5 to 9. By this method, the material left between the upper end of the aperture 10" and the apex of the straight sided recess 10' is cut down as shown in Figure 6 at two positions 21 and 22 over the end 12" of the pin. This prevents the pin from moving outwardly through the screw. This locking feature is carried out by a special punch or tool 24 carrying a pair of knives or tapered edges 26. After the pin is driven in place, the tool 24, of the proper size, is placed within the recess 10' of the screw and by driving the tool into the screw, the cutting points 26 will engage the material lying between the aperture 10" and the apex of the converging sides of the straight sided screw forcing this material over the outer end 12" of the pin as shown at 21 and 22 in Figure 6.

The tool 24 may take a number of forms; the one shown is very simple and practical in that it shows a stem which is adapted to fit within the hexagonal recess 10' of the screw and having an enlarged outer end portion 24' which may be tapped with a suitable hammer. The lower end of the punch is provided with tapered cutting edges 26 for urging the material at the bottom of the recess and lying between the aperture 10" and the apex of the convering sides and bending it over the head of the pin.

While Figures 5, 6 and 7 show the tool carrying two cutting edges, Figures 8 and 9 show the tool carrying cutting points 29 for cutting each apex of the converging sides of the hexagonal recess 10'.

The tool 24 may incorporate other features (not shown) of a combination wrench and punch for driving the pin, and cutting means for locking the pin within the screw as previously described.

In order to remove the special lock screw from the locked members 14 and 16, a wrench is applied to the recess and the screw 10 is backed out of the first member, the pin 12 being withdrawn from the second member by the screw as the pin is held within the screw by the taper. After the screw and pin have been removed, the pin may be removed from the screw by driving the pin back through the recess 10'.

The present lock screw is adapted to many uses, and while the device is specifically illustrated for securing a pulley 13 to a round shaft 16, the member may be of various cross-sectional forms. For example, the lock screw may serve as means for locking various types of supporting members to rectangular, square, or various shaped bars for various forms of construction.

The advantages of the present lock screw is that both the principles of the standard set screw and a tapered pin may be incorporated within a single device, and that both the screw and the pin may be removed by one operation, which is by simply removing the screw. After the screw has been removed from the first member together with the pin, the pin may be readily removed from the screw by tapping the end of the pin from the bottom. Another advantage is that in applying the lock screw to the first and second elements, the screw is first screwed into the outer or first element, and the second element is drilled without removing the screw, or removing or shifting the first element relative to the second element. A further advantage is that when the tapered pin is driven through the tapered hole in the set screw that portion of the screw is expanded locking the screw into the threaded aperture 14' of the member 14. Still another advantage is that it can be more easily installed and removed in difficult places.

The form of the invention is not to be limited to the exact arrangement of parts shown in the foregoing drawings and specifications as various changes in the details of construction may be resorted to without departing from the spirit of the invention and only in so far as the invention has been particularly pointed out in the accompanying claims is the same to be limited.

I claim:

1. In a device for securing wheels, pulleys and the like to a shaft, the combination of a set screw and a pin, the outer portion of the set screw being adapted to receive means for operating the said screw, the inner portion of the set screw being provided with a tapered aperture, the said pin having its outer end fitting within the tapered portion of the said set screw, the inner end of the pin extending beyond the inner end of said set screw and adapted to extend into an aperture within the shaft.

2. A set screw adapted to be threadably receivable within an aperture in a first member and extendable therethrough to engage a second member which is normally movable relative to the said first member, the set screw being provided with a recess within the outer portion thereof having a plurality of flat surfaces for receiving an engaging means for operating the said screw, the screw having a tapered aperture extending inwardly therethrough from the bottom of the said recess, a tapered pin the outer end of which fits within the tapered aperture within the screw and extends beyond the inner end thereof and is adapted to engage an aperture within the second member, the axes of the apertures of the first and second members being substantially in the same line.

3. A lock set screw adapted to be threadably receivable within an aperture in a first member and extendable therethrough to engage a second member which is normally movable relative to the said first member, the set screw being provided with a recess within the outer portion thereof having a plurality of flat surfaces for receiving an engaging means for operating the said screw, the screw having a tapered aperture extending inwardly therethrough from the bottom of the said recess, a tapered pin the outer end of which fits within the tapered aperture within the screw, the outer end of the pin extending within the aperture of the screw slightly beyond the bottom of the recess, the inner end of the pin extending beyond the inner end of the screw and engagable in an aperture within the second member, the bottom of the recess adjacent the outer end of the pin extending over the outer end thereof for securing the same in locked position.

4. A lock set screw adapted to be threadably receivable within a threaded aperture in a first member and extending therethrough to contact a second member, the set screw having an aperture extending therethrough and tapered inwardly toward the bottom of the screw, a tapered pin, the outer end of which fits within the tapered aperture within the screw and extends beyond the inner end thereof and engageable in an aperture within the second member having substantially the same form as the inner end of the pin.

5. A lock screw adapted to be threadably receivable within a threaded aperture in a first member and extendable therethrough to contact a second member, the set screw having an aperture extending therethrough and tapered inwardly toward the bottom of the screw, the screw having a tapered pin, the outer end of which fits within the tapered aperture within the screw, extends beyond the inner end thereof and is engagable in an aperture within the second member, the outer upper edge about the set screw aperture extending over the edge of the outer end of the pin for securing the same in locked position.

6. A locking device for telescoping members in the form of a set-screw and pin, the set-screw being adapted to be fixably secured within an aperture within an outer member and extendable therethrough to contact an inner member, the set-screw having an aperture extending therethrough and tapered inwardly toward the inner end thereof, the outer end of said pin fitting the tapered aperture within the set-screw and said pin extending beyond the inner end thereof and engaging an aperture formed within the inner member.

RICHARD LA VERN KINDSVATTER.

REFERENCES CITED

The following references are of record in the file of this patent:

UNITED STATES PATENTS

| Number | Name | Date |
| --- | --- | --- |
| 1,033,419 | King | July 23, 1912 |
| 2,351,243 | Vetter | June 13, 1944 |
| 2,355,901 | Beede | Aug. 15, 1944 |